Inventor:
Dumitru Morozan

United States Patent Office 3,407,043
Patented Oct. 22, 1968

3,407,043
METHOD AND APPARATUS FOR RAPID DETERMINATION OF 1-PHENYL-3-PYRAZOLIDONE (PHENIDONE) IN DEVELOPING SOLUTIONS
Dumitru Morozan, Buftea, Raionul Racari, Rumania, assignor to Comitetul de Stat pentru Cultura si Arta Bucharest, Piata Scinteii, Rumania
Filed July 12, 1966, Ser. No. 564,564
Claims priority, application Rumania, July 13, 1965, 50,005
5 Claims. (Cl. 23—230)

ABSTRACT OF THE DISCLOSURE

Rapid determination of phenidone in photographic developing solutions of the hydroquinone-phenidone type is effected by making use of a photographic method to measure the photographic effect produced by a developing solution when diluted with a buffer on a non-sensitized exposed film while it is in the solution. The measurements are made by a photoelectric colorimeter provided with two photoelectric cells sensitive to red light and a source of non-actinic light. A tank or container containing the solution to be analyzed and the film, exposed on half of its surface only, is located between the light source and one of the cells, so that light is directed on the exposed and unexposed parts of the films. A milliampermeter is used to measure the darkening level which, in turn, is converted to phenidone concentration.

---

The present invention relates to a method and an apparatus for rapid determination of 1-phenyl-3-pyrazolidone (phenidone) by a photochemical process in the developing solutions of the hydroquinone-phenidone type.

The determination of phenidone in the photographic developing solutions is difficult, due in the first place to its low concentration (about 0.2 g./l.) and also to the fact that phenidone is usually extracted together with hydroquinone from the developer. In most cases, phenidone determination methods as described in the literature do not lead to accurate results when they are used for developing solutions. A spectrophotometrical method for determination of phenidone in developers containing hydroquinone is known, but this method requires spectrophotometers which usually are not available in the laboratory equipment for film treatment. The specially qualified operators for these works are also usually not available.

There are also known chemical methods for phenidone determination in the developer solutions by indometric titration (Axford method), iodometric titration in chloroform, acidimetric titration with perchloric acid, or oxidimetric titration with ferric chloride solution. All these methods have the disadvantage of being laborious, and of including solvent extractions, titrations, retitrations phases, etc. In some cases it is also difficult to observe the end point of the titration, and in other cases the results are not reproducible.

There is a known proposal for determination of hydroquinone in the developer solutions by determining the blackening produced by this developer on a photographic film. But this method has the disadvantage of using a solution of developers having an operating concentration so that the blackening is produced by all the factors present in the solution.

For determination of the photographic blackening, the application of a zero transmission densitometer is known which makes use of the zero system for measuring. This densitometer is provided with two photoelectric cells, one of which receives the light pencil transmitted through the photographic material, the other cell being directly lighted by the luminous source of the apparatus. This apparatus has the disadvantage of requiring a previous treatment of the developed films, such as washing, fixation, and drying.

The present invention avoids the above mentioned disadvantages since it includes a method and apparatus for determining phenidone by a photochemical method by measuring the photographic effects produced by a developer solution previously diluted with a buffer solution, on a non-sensitized uniformly exposed film, the reading being done while the film is in the solution, and this determination being made by means of a photoelectric colorimeter provided with two photoelectric cells lighted by non-actinic light. Between one of the photoelectric cells and the nonactinic light source is placed the tank with solution to be analyzed into which is placed the film used for determining the photographic effect.

This analytical method is based on the property of the phenidone containing developer to have developing activity which is intensively influenced by the phenidone concentration where the latter is very low and namely within the limits of 0.003–0.05 g./l.

The present invention is illustrated in connection with the drawing accompanying this application, in which.

Figure 1:
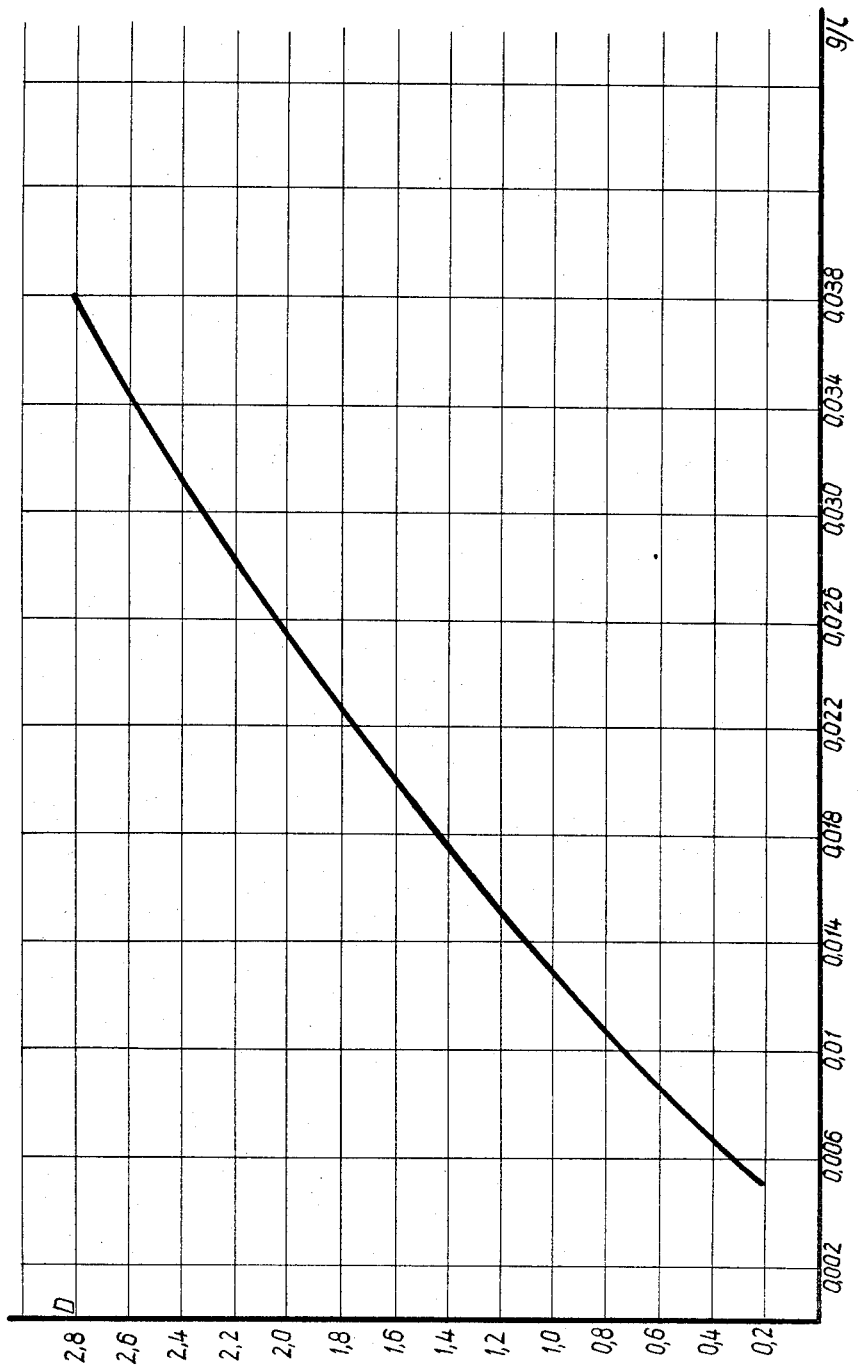
FIG. 1 is a diagram showing the relation between optical density D of a positive film and concentrations of phenidone in grams per liter.

The property of the phenidone containing developer as described above is ilustrated in FIGURE 1 by a diagram showing the relation between photographic effects, i.e., the optical density D and the concentrations of phenidone in g./l., under the conditions of a positive film of Feinkorn (fine grain) II ORWO type exposed to an illumination quantity of 200 lux per sec., developed during 9 min. at 20° C. in developers having various phenidone concentrations according to the following receipt:

hydroquinone—3 g./l.;
phenidone from 0.006 to 0.038 g./l.;
crystallized sodium sulfite—200 g./l.;
borax—2.0 g./l.;
boric acid—3.0 g./l.;
potassium bromide—1.0 g./l.

In order to provide the optimal analysis conditions it is necessary to dilute the developer to be analyzed so as to obtain phenidone concentrations within the limits 0.003–0.04 g./l. for obtaining the maximum of sensitivity and for avoiding the chemical action of other substances included in the developer.

The dilution must be obtained with a buffer solution for obtaining a stable pH in the course of time and its value must not be higher than pH=9. After dilution, the concentration of hydroquinone must be reduced to a normal operating value of 3–5 g./l. according to the chosen operating conditions which must be observed.

The photographic effects which can be made use of for indicating the phenidone content are either the value of the photographic blackening effect obtained after a certain developing time or the necessary developing time for attaining certain photographic blackening values.

The use and measurement of the photographic effects according to the invention can be carried out either by using known densitometers for measuring the optical density obtained after complete treatment of the film (developing, fixation, washing, and drying), or by using a special apparatus which enables one to measure the photographic blackenings directly on the film in the developer solution for reducing the time required to make the analysis.

Figure 3:
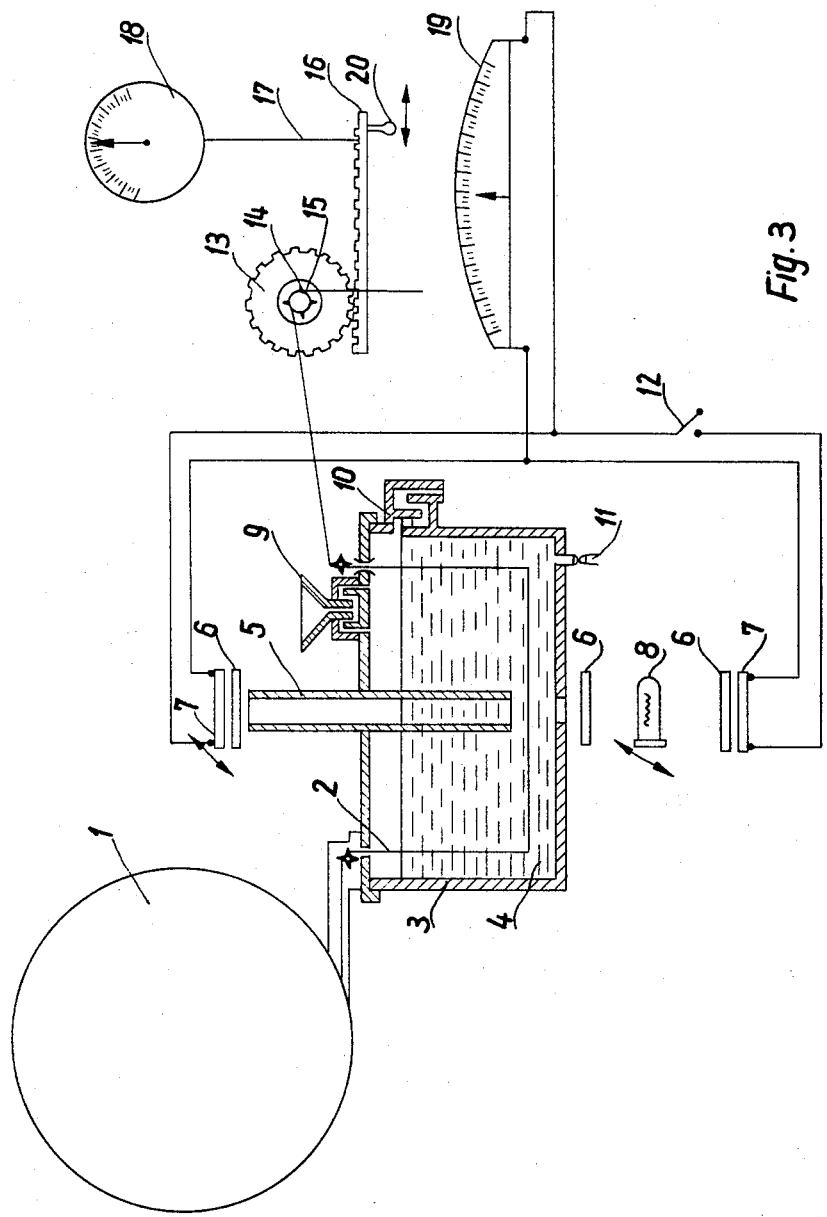
FIG. 3 is a diagrammatic view partly in section of an apparatus for determination of phenidone concentrations in accordance with the invention.

An example of application of the invention and its relation also to the application of the apparatus for the determination represented in the principal scheme of FIG. 3 are given as follows:

Assume that we want to determine the concentration of phenidone in a developer of the negative type into which the concentration of phenidone should be of about 0.2 g./l. A quantity of 25 ml. of the solution to be analyzed is exactly measured with a pipette and introduced in a calibrated flask of 500 ml. The solution is mixed with about 200 ml. of buffer solution previously prepared for determinations and containing 200 g./l. of crystallized sodium sulfite, 2 g./l. of borax, 3 g./l. of boric acid and 1 g./l. of potassium bromide. In the obtained mixture, 1.50 g. of hydroquinone weighed by means of a technical balance is dissolved and the solution is brought to the mark with buffer solution. The freshly prepared solution is brought to the temperature of 20° C. and is poured into the developing tank 3 of the apparatus (FIG. 3) through the feeding opening 9 until the solution 4 overflows from the tank through the overflow 10. The tank 3 is perfectly obscured and into it is provided a fine grained positive film 2, which was previously uniformly illuminated on a half of its surface only in a film copying apparatus.

The non-actinic-light flow of the light source 8, can be directed either on the part of the film which was not exposed or on the part which was already exposed. Through the light directing tube 5, the light flow which passes through the film 2 is detected by the photoelectric cell 7 located above the tube 5, which is connected in a differential photometric system with the second photoelectric cell 7 which is situated on the other side of the light source 8 and the milliampermeter 19 which is connected with the switch 12.

The zero and maximum points on the milliampermeter are first established by means of the regulating diaphragms 6, the light flow being directed on the non-exposed part of the film, then by completely pushing the handle 20, the film which is closely above the developer level is brought into the path of the light flow which is this time directed on the exposed part of the film. After the lapse of the selected time for developing (this time preferably being 1', 1'30") the darkening level is read as divisions on the milliampermeter after which the zero and maximum points of the apparatus are verified on the non-exposed part of the film.

The handle 20 is firmly fastened to the rack 16 which is geared to the gear-wheel 13 and its motion is transmitted to the film winding bobbin 15 by means of a connecting means 14 in a single motion sense from the cassette film magazine 1 to the winding bobbin 15.

When the film is drawn above the developing solution 4 in front of the luminous flow the chronometer 18 by means of a lever 17, starts for measuring the developing time.

After measuring the photographic darkening, the developing solution 4 is let out by opening the cock 11, and the tank and film are washed with distilled water.

Figure 2:
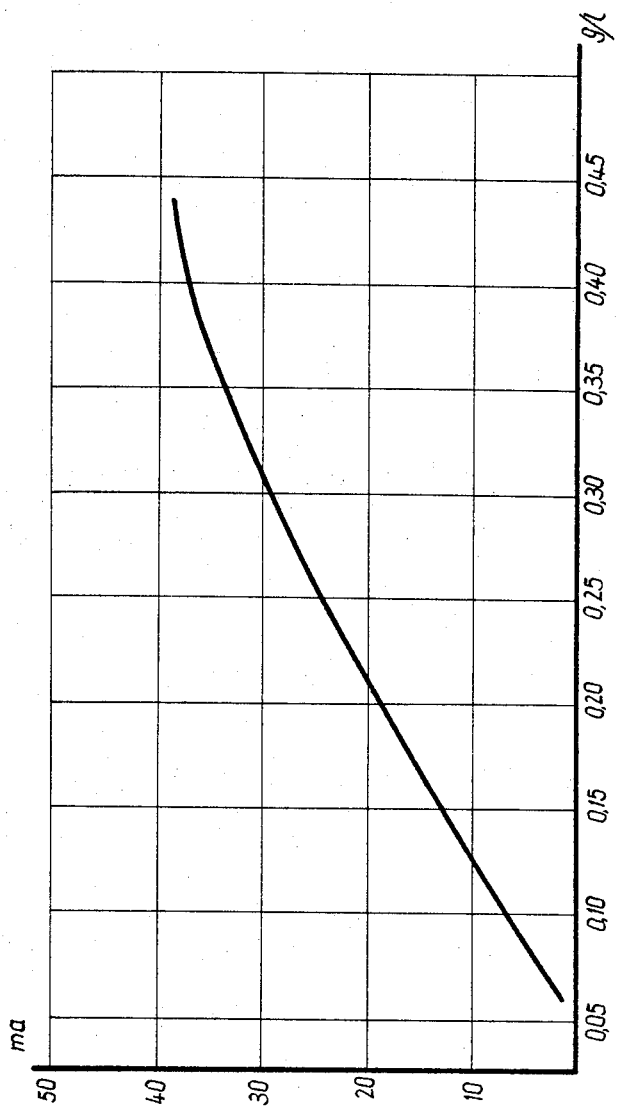
FIG. 2 is a diagram for the conversion of milliamperes (ma.) into phenidone concentrations in grams per liter.

The values obtained by means of the apparatus, i.e., milliampere divisions (ma.), are converted into phenidone concentrations by means of a calibration curve (FIG. 2) previously drawn with known phenidone concentrations in g./l., in the same operating conditions, by using the same dilution buffer solution, photographic film, etc.

The determinations are carried out in a room lighted by non-actinic light.

The present invention presents the following advantages:

The operation method is simple, does not require special qualified operators, it is very quick, the duration of an analysis being not longer than 5 minutes and the results are sufficiently accurate for the technological purposes of the photographic film treatment.

I claim:

1. In the method of determining phenidone concentrations in developing solutions in which the solution to be analyzed is diluted with a buffer solution, wherein the improvement comprises the steps of diluting the solution to be analyzed with a buffer solution to provide a phenidone concentration within the limits of 0.003 to 0.05 g./l., placing a previously exposed photographic film in the buffered solution for a predetermined period and photochemically measuring the photographic effect produced by the solution on the film while the latter is in the solution.

2. The method as claimed in claim 1, wherein the film was previously exposed on half its surface only.

3. The method as claimed in claim 1, wherein the buffered solution contains hydroquinone in a concentration of 3 to 5 g./l. and has a pH not exceeding 9.

4. In an apparatus for rapid determination of phenidone in developing solutions, including a means provided with two photoelectric cells for measuring the photographic effect of the solution, a light source and a container holding the solution to be analyzed and located between the light source and one of the photoelectric cells, the improvement wherein the light source is arranged to send light through the solution to said one cell and also directly to the other cell, a test photographic film in the solution in the container, previously exposed on half its surface only and subject to the light from said light source, means for moving the film into and through the solution in the container, and wherein said cell is located in a position to receive light from said source through the film while it is in the solution.

5. The apparatus as claimed in claim 4, wherein the source of light is non-actinic and said cells are sensitive to said non-actinic light.

References Cited

UNITED STATES PATENTS

| | | | |
|---|---|---|---|
| 2,590,830 | 3/1952 | Williford et al. | 296—27 |
| 2,980,512 | 4/1961 | Petersen | 23—253 |

OTHER REFERENCES

Ficken et al.: "The Photographic Properties of Some Novel Analogues of Phenidone." The Journal of Photographic Society, vol. 11, pp. 157–164, 1963.

Tojo et al.: "Rapid Spectrometric Method for the Determination of 1-phenyl-3-pyrazolidone in Photographic Developers," Chem. Abs., vol. 55, p. 16236, August 1961.

MORRIS O. WOLK, *Primary Examiner.*

E. A. KATZ, *Assistant Examiner.*

PO-1050
(5/69)

UNITED STATES PATENT OFFICE
CERTIFICATE OF CORRECTION

Patent No. 3,407,043                    Dated  October 22, 1968

Inventor(s) D. MOROZAN

It is certified that error appears in the above-identified patent and that said Letters Patent are hereby corrected as shown below:

Column 4, line 42, (Claim 4) --one-- has been inserted after "said".

SIGNED AND
SEALED
MAR 3 - 1970

(SEAL)
Attest:

Edward M. Fletcher, Jr.
Attesting Officer

WILLIAM E. SCHUYLER,
Commissioner of Patent